US008360835B2

(12) United States Patent
Strause et al.

(10) Patent No.: US 8,360,835 B2
(45) Date of Patent: Jan. 29, 2013

(54) VIRTUAL WORLD OF SPORTS COMPETITION EVENTS WITH INTEGRATED BETTING SYSTEM

(75) Inventors: Jonathan Strause, Bethesda, MD (US); Marcus Corrie, Dundee (GB)

(73) Assignee: I-Race, Ltd., Road Town, Tortola (VG)

( * ) Notice: Subject to any disclaimer, the term of this patent is extended or adjusted under 35 U.S.C. 154(b) by 926 days.

(21) Appl. No.: 12/289,231

(22) Filed: Oct. 23, 2008

(65) Prior Publication Data

US 2009/0149233 A1 Jun. 11, 2009

Related U.S. Application Data

(60) Provisional application No. 60/999,992, filed on Oct. 23, 2007.

(51) Int. Cl.
*A63F 9/24* (2006.01)
(52) U.S. Cl. .............................. 463/7; 463/1
(58) Field of Classification Search .................. 463/1, 7
See application file for complete search history.

(56) References Cited

U.S. PATENT DOCUMENTS

| | | | |
|---|---|---|---|
| 4,918,603 A * | 4/1990 | Hughes et al. ..................... 463/4 |
| 5,769,714 A | 6/1998 | Wiener et al. | |
| 6,007,427 A | 12/1999 | Wiener et al. | |
| 6,024,643 A | 2/2000 | Begis | |
| 6,292,706 B1 | 9/2001 | Birch et al. | |
| 6,325,721 B1 * | 12/2001 | Miyamoto et al. ............... 463/40 |
| 6,358,150 B1 * | 3/2002 | Mir et al. ......................... 463/28 |
| 6,371,855 B1 * | 4/2002 | Gavriloff ......................... 463/42 |
| 6,616,529 B1 | 9/2003 | Qian et al. | |
| 6,848,991 B2 | 2/2005 | Kusuda | |
| 6,860,806 B2 | 3/2005 | Kojima et al. | |
| 6,921,331 B2 | 7/2005 | Gatto et al. | |
| 7,548,242 B1 * | 6/2009 | Hughes et al. ................. 345/473 |
| 2002/0065566 A1 * | 5/2002 | Aronson et al. ................ 700/91 |

(Continued)

FOREIGN PATENT DOCUMENTS

| EP | 0 934 765 | 2/1998 |
|---|---|---|
| WO | WO 01/41447 | 6/2001 |

(Continued)

OTHER PUBLICATIONS

Jim Adams, letter, Feb. 4, 2005, Kennedys Patent.

*Primary Examiner* — Peter DungBa Vo
*Assistant Examiner* — Nicholas Ditoro
(74) *Attorney, Agent, or Firm* — Venable LLP

(57) ABSTRACT

The present invention provides a system that creates virtual events within a virtual world. A virtual event may be akin to a real event, but is completely computer generated within a computer-generated world and is based on statistical measures, either real world or created. Numerous characteristics about the competitors and the competition location parameters are available before a competition event. Based on the known parameters about the location of an event and the characteristics of the participants and their historical past performances in similar events enable bettors to make informed wagers on an event that greatly enhances the satisfaction and involvement in a competition event. As such, Histories of virtual events are maintained on actual virtual performance data of competitors in the virtual world. The histories can include all relevant virtual data about a competitor and the past events the competitor competed. Individuals throughout the real-world may place wagers (e.g., bets) on the outcome of either a pari-mutuel event or a fixed odds event, utilizing either pari-mutuel, exchange wagering or fixed odds wagering systems. The virtual event may be any type of sport, or skill based game that is usually between competitors.

5 Claims, 15 Drawing Sheets

U.S. PATENT DOCUMENTS

| | | |
|---|---|---|
| 2003/0078087 A1* | 4/2003 | Kojima et al. .................. 463/6 |
| 2004/0053686 A1* | 3/2004 | Pacey et al. .................. 463/25 |
| 2005/0044575 A1 | 2/2005 | Der Kuyl |
| 2005/0148388 A1 | 7/2005 | Vayra et al. |
| 2005/0261043 A1 | 11/2005 | Slade |
| 2006/0046807 A1 | 3/2006 | Sanchez |
| 2006/0183547 A1 | 8/2006 | McMonigle |
| 2007/0060380 A1 | 3/2007 | McMonigle et al. |
| 2007/0087804 A1 | 4/2007 | Knowles et al. |
| 2007/0087825 A1 | 4/2007 | Hart et al. |
| 2007/0244878 A1 | 10/2007 | Hulme et al. |
| 2007/0293289 A1 | 12/2007 | Loeb |

FOREIGN PATENT DOCUMENTS

| | | |
|---|---|---|
| WO | WO 01/59680 | 9/2001 |
| WO | WO 03/011411 | 2/2003 |
| WO | WO 2005/009566 | 2/2005 |
| WO | WO 2005069182 | 7/2005 |

* cited by examiner

VIRTUAL WORLD OF SPORTS COMPETITION EVENTS WITH INTEGRATED BETTING SYSTEM

RELATED APPLICATION

This application claims the benefit of U.S. Provisional Application No. 60/999,992, filed Oct. 23, 2007 and entitled "VIRTUAL WORLD WITH INTEGRATED BETTING SYSTEM", which is incorporated herein in its entirety.

BACKGROUND OF INVENTION a) Field of the Invention

The present invention relates to a system method and computer program product used in creating a series of virtual events within a virtual world to be presented as real-time content for bettors to wager on. More particularly, a virtual event may be akin to a real event but may be completely computer generated within a computer-generated world based on statistical measures either real world or created. The system will include a virtual world engine, a virtual event engine, a virtual broadcast engine, a virtual world application programming interface (API) and an integrated betting system.

b) Description of the Related Art

In the video game market involving Football, Soccer, Basketball, Horse Racing, etc., simulation engines are used to allow individuals to play a sport virtually with examples such as with Madden Football, Tiger Woods Golf, G4 Jockey, or Winning Post. Typically this simulation involves real teams and real players emulated virtually. Individuals participate in the game by using interactive joysticks, controls, etc., therefore it is interactive.

The fantasy (or Rotisserie) games typically involve customers/participants who construct unique sports teams based on drafting players from a variety of teams. The clients compete with virtual teams based on a point system that directly determines how the actual players perform in real world games. In some cases, these teams compete in a simulation to determine an outcome of an event not related to any real world event, but solely determined by a simulator.

In the gaming (Casino, Horse Betting, Sports Betting, etc.) virtual events are used for gambling either via a slot machine (kiosk or terminal wagering), or a monitor (simulcast TV screens at track or a betting shop). Individuals bet on virtual events by placing money directly into a slot machine, or like they would bet at a real life horse race where an individual walks up to a window and places a bet with a person or on a betting terminal.

Also, in the gaming market, a random number generator will determine the outcome of a race or fight (or event subcomponent such as round of a fight, a quarter of a race, a period of a game). For example in a horse race, a random number generator will determine the outcome based on either randomly selecting equally weighted horses (all have equal chance of winning) or randomly selecting probability weighted horses (where they have a probabilistic chance of winning).

In the interactive gaming market and in the simulation system found within, the combination of either play-by-play, punch-by-punch, or step-by-step complex algorithms, optimization models, decision trees, and probabilistic dice rolls are all utilized to determine how one competitor (or team) will behave and then independently how the different competitors or teams will respond. These events occur in an "environment" that has goals (scoring a touchdown, knocking out an opponent, winning a race), that has rules (where a competitor can hit, how much weight a horse must carry, etc.), constraints (the environmental constraints of a track, the physical constraints of not being able to run "through" other competitors), and the effects of other competitors (another player tackling you or forcing a fumble, another horse being in front of you and impeding your progress, being hit or bumped during a fight, game, or race, etc.). The outcome of a simulation system depends on the actual completion of the interactive event by the competitors, and the outcome is determined once one or more competitors have successfully completed the event.

Some simulations rely have utilized a random number generator where each competitor in a competition has a statistically pre-determined or specified chance of winning. Other simulations have utilized a multi-player interactive system in which some aspects of the artificial world develop over time and the outcome is influenced by instructions received from a plurality of players.

Throughout the real world, individuals may bet on games of chance or number selection games such as keno, bingo or other "lottery" type games, or they may bet on the outcome of competitions such as sporting or racing events. Historically these activities had to be done in person. The widespread access to the Internet and other electronic distribution methods has provided individuals with the access not only to wager remotely on a competition, but also to watch the event on which they wagered in real time. Individuals engage in the activity of placing wagers (e.g. bets) on the outcome of an event (sporting event, political event, etc.) by placing: a) pari-mutuel wager, b) a fixed odds wager, or c) an exchange wager utilizing their respective betting systems. Individuals utilize their knowledge of the sport and the individual entrants; analyze the strengths and weaknesses of the competitors as well as the conditions of the venue in order to select a wager.

Traditional fixed odds virtual sports systems, betting exchanges or other pari-mutuel virtual sports systems are based upon a singular random number generator. Each competitor has a statistically pre-determined or specified chance of winning and these events are believed to be inherently limited and inflexible in their application over a broad network of bettors. An event determined by a single randomly generated number do not allow for a competition in which an individual may impart skill in their knowledge or analysis in selecting a wager and they do not allow an individual to have an advantage over other bettors or a book maker.

Traditional racing events that are wagered on using pari-mutuel wagering systems have race histories associated with each competitor that are available to the bettor to help them handicap the race and improve their likelihood of winning money over time. This is why pari-mutuel wagering on horses has been treated as a skill wager. However, other virtual events (because they are determined by a random number generator) usually do not have a known history of each competitor's past race performance and additionally, who were the other competitors in past events to help assess one horses performance relative to another.

The present invention differs from US Patent Publication No. 2005/0044575 A1 (hereafter the "575" patent) by providing a fully automated, non-interactive system. Whereas the 575 patent uses real-world player inputs to influence the outcomes of virtual world events, and emphasizes the massively multiplayer interactive aspect of gaming, the present invention removes real-world player input altogether and evolves the world and events using computer algorithms. The present invention thus fully develops automated evolution of virtual world inhabitants using computer algorithms, and their performance and behaviors are entirely computer controlled. This allows the present invention to be used in unbiased pari-mutuel wagering and fixed odds wagering, and makes it acceptable to gaming authority approval and regional regulatory requirements. Furthermore the present invention does not necessarily require a television network in order to deliver visual content, and uses a novel approach to delivering high definition video to remote locations. Finally the present invention presents extra facilities in order to create fixed odds for these virtual events, and present information for pari-mutuel wagering on these events to real-world players.

SUMMARY OF THE INVENTION

It is the object of the present invention to provide a system that autonomously creates virtual events within a virtual world. A virtual event may be akin to a real event, but is completely computer generated within a computer-generated world and is emergent from computer algorithms that create realistic models of the event using numerous characteristics about the competitors and the competition location conditions.

Histories of virtual events are maintained and stored on actual virtual performance data of competitors in the virtual world. The histories can include all relevant virtual data about a competitor and the past events the competitor competed, and can be accessed prior to a virtual event beginning, for example racing form.

The virtual event may be created by an event engine, scheduled, and broadcast or simulcast in real-time through-out the real-world using existing and conventional video transport media, such as web, TV, satellite, telephone network, and cable. A video delivery system is used that will allow high quality high definition video to be broadcast worldwide with very low bandwidth requirements (<20 kb/s).

Individuals throughout the real world may place wagers (e.g., bets) on the outcome of the event in either a pari-mutuel or a fixed odds fashion, utilizing conventional pari-mutuel, exchange wagering or fixed odds wagering systems. The virtual event may be any type of sport, or skill based game that is usually between competitors. Events that can be simulated include sporting events such as a horse race, an auto race, a stock car race, a Formula 1 race, a NASCAR race, a boxing match, a kick boxing match, an ultimate fight match, a wrestling match, a basketball game, a soccer game, a rugby game, a football game, a baseball game, a hockey game, a lacrosse match, a dog race, a greyhound race, a harness race, a steeplechase and other skill based games and wagering events. Prior to the broadcast of the virtual event, promotion of the event may be made similar to a real-world event (e.g., similar to a promotion of a heavy-weight boxing fight in Las Vegas). Promotional activities can include TV advertising, pamphlets, posters, mailers, magazine and paper articles, presentations, web-advertisements, emails to subscribing customers and other forms of marketing.

DETAILED DESCRIPTION OF THE PREFERRED EMBODIMENTS

Figure 1:
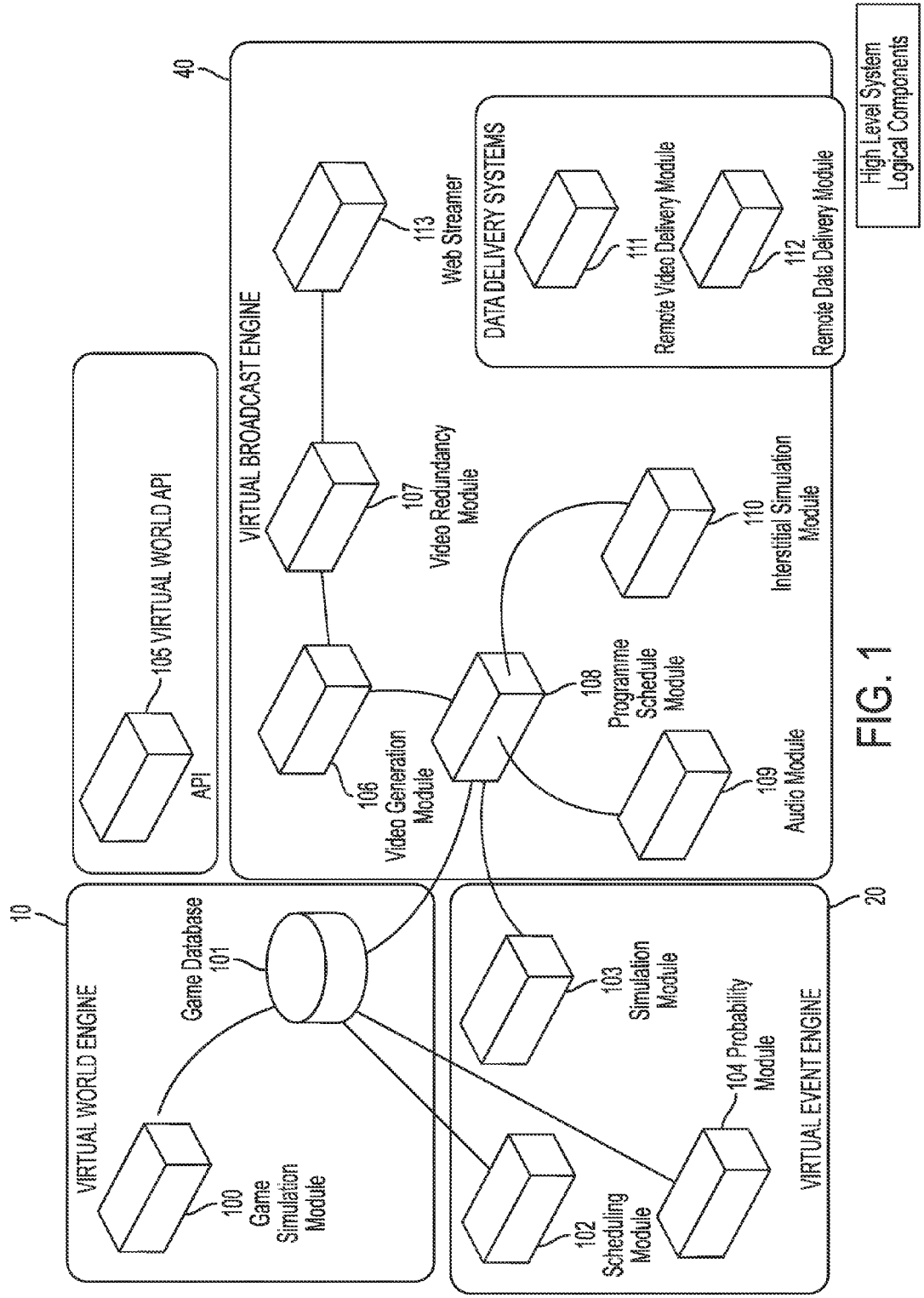
FIG. 1 is a system that creates virtual events within a virtual world and includes a virtual world engine, a virtual event engine, a virtual broadcast engine, an integrated betting system, and a virtual world API.

The competitors in the virtual events (e.g., human, machine or animal) may be modeled in a pervasive virtual world where they train for their virtual events and perform many of the typical functions of their real-world counterparts. The bettors who can wager on the live virtual events may know the existence and activities of these competitors in the virtual world. For example, in the virtual thoroughbred racing system, bettors may know how a particular horse has trained, who has trained it, what the diet was, what the bloodline is, who is riding it, what the health status is, along with a broad set of other attributes and information, most specifically the past performance information for the horse relative to the other horses in the virtual world. The virtual world itself may be modeled such that weather and conditions affect the behavior of the competitors within it, before and during a virtual event. In addition to the visual appearance of the world, physical characteristics are also modeled, such as surface response to weather patterns, (ground becomes muddier or waterlogged with rain), air temperature (ground dries out, or freezes), wind speed and direction (impedance due to strong winds), humidity and other seasonal effects such as snow cover.

The software, for instance, may be a plurality of computer programs that interface with one another to create the virtual world, create the virtual events and broadcast the live events. The computer programs may be created in any programming language to provide a realistic sporting event using state-of-the art technology. Software languages such as Flash, C++, and Java may be used. For processing and simulation, C and C++ may be utilized. For display and rendering, DirectX may be used. For web data programming and API support, XML and Java may be used. For presentational aspects of the virtual events, web technologies such as Flash, HTML, and JSP may be used. The implementation is not to be limited in scope by platform, and may utilize both UNIX and PC-based operating systems to deliver the virtual event. Other programming languages may also be used depending on the deployed platform, and skill sets available. The disclosure extends to computer programs in the form of source code, object code, binaries, code intermediate sources and object code (e.g., such as in a partially complied form), or in any other form suitable for implementation of the disclosure. Computer programs may be stand-alone applications, software components or plug-ins to other applications. Computer programs may be stored on any storage medium, such as ROM, RAM, optical recording media, CD-ROM, DVD, magnetic recording material, and the like. Software can be stored on computer readable medium. It is important to note that while the present invention has been described as a method, those skilled in the art will appreciate that the method of the present invention is capable of being distributed in the form of a computer readable medium of instructions in a variety of forms, and that the present invention applies equally, regardless of the particular type of signal bearing media utilized to carry out the distribution. Examples of computer readable media include: non-volatile, hard-coded type media such as read only memories (ROMs) or erasable, electrically programmable read only memories (EEPROMs), recordable-type media such as floppy disks, hard disk drives and CD-ROMs and transmission-type media such as digital and analog communication links.

The virtual game system may generate photorealistic visual quality. The video and visual quality of the virtual sporting event may transcend any virtual gaming content presently commercially available. For instance, whilst watching a virtual horse race, one can clearly see the difference in the life-like nature of the motion-captured three-dimensional thoroughbreds with extreme precision to show each horse's coat markings, muscle structure and shadows. Furthermore, the virtual background setting can be at the world's most premier facilities (e.g., Madison Square Gardens for boxing, Wimbledon for tennis, Monaco for Formula-1 racing, as well as famous horse racing tracks around the globe in venues such as New York, Paris, England and Hong Kong) or can be venues that exist only in the virtual worlds that exists in software and computer systems.

Events that can be simulated include sporting events such as a horse race, an auto race, a stock car race, a Formula 1 race, a NASCAR race, a boxing match, a kick boxing match, an ultimate fight match, a wrestling match, a basketball game, a soccer game, a rugby game, a football game, a baseball game, a hockey game, a lacrosse match, a dog race, a greyhound race, a harness race, a steeplechase and other skill based games and wagering events.

For pari-mutuel, fixed odds and exchange betting markets and similar to most pari-mutuel real-world systems, players may make a specific wager (with a plurality of wager types) on the outcome of the event using the integrated betting systems, such as integrated point of sale (IPOS) terminals and kiosks and the like or through an affiliates totalizator or "tote systems. Pari-mutuel wagering is enabled by providing a rich history of information about the competitors, the events and performance, to allow players to make an informed decision. The history of each event and performance of each competitor is stored by the computer system. Wagers can be made through a variety of means, such as web, shop cashier, telephone and mobile devices. Betting can be deployed to ensure local regulations specific to the territory are adhered. Each wager may be associated with a pool of wagers from other players wagering on the event, as in pari-mutuel wagering. After betting is opened, a player may place a wager (e.g., make a bet) at any time. All betting may be stopped at a pre-determined time before the live virtual event begins (e.g., such as a one minute period of time, but this could be any pre-determined amount of time). A pre-determined amount of all the wagers made may be retained by the licensed betting operator and the remaining amount may be distributed to the winning players, regardless of the outcome of the race. For some types of pari-mutuel wagers, if there is no winner, a pre-determined amount of each specific wager type may be redistributed into the pool for the next event. Also, pari-mutuel betting may allow bettors from all over the globe to bet on the same virtual sporting event (e.g., a horse race, a car race, a boxing match, etc.). Thus, a bettor can be located anywhere in the world adhering to their local regulatory requirements when betting. For instance, a bettor may be physically located in Japan, Argentina, Australia, United Kingdom, Mexico, Venezuela, Panama, Columbia, Brazil, Hong Kong, Korea, France, Canada, the United States, Eastern Europe, Russia, Venezuela, and he/she can place a bet for the same virtual event. In addition, the virtual event enables progressive or cumulative wagering. Wagering can be integrated with an existing tote per the existing United States betting system. Thus, a global pari-mutuel betting pool is provided.

Unlike typical fixed odds virtual sport systems or the few pari-mutuel virtual sport systems commercially available or in development, the outcome of the virtual event in this disclosure is not based on a singular random number generator where each competitor in a race has a statistically pre-determined or specified chance of winning. The outcome can be determined real-time as the virtual event unfolds based on a plurality of factors using perturbation models with algorithms. Thus, each event may be a unique event for which the outcome is unknown when the event begins and for which the outcome of the event cannot be "fixed" or manipulated. Specifically, and usually, for fixed odds betting markets, before the event transpires, outcome probabilities may be calculated, using a related but separate subsystem, by simulating the event thousands of times, thus it is possible to calculate fixed odds for an instance of the event. The traditional way fixed odds virtual events are created utilizes the "jukebox" approach, which is based on a single or a few random number generations and utilizing a database of pre-recorded races that represent the result derived by the random number generator. These traditional fixed odds system are suitable for the more traditional slot machine style games, and is how many existing technologies work.

A broadcast of the virtual event may be via many media. For instance, the virtual event may be broadcast via satellite, via cable, telephone network, or any other known communication means. The broadcast may be made to a television, a cell phone, a PDA, a kiosk, a WiFi enabled tablet, or any online, mobile betting type device. The format of the virtual event may be produced at the delivery point in Phase Alternating Line (PAL), National Television System Committee (NTSC), or high definition (HD) or any other approved transmission scheme.

The virtual event may be broadcast in real-time with live computer generated commentary (e.g., in a plurality of languages besides English, such as Spanish, Mandarin, Russian, Portuguese and Italian) that provides moment-by-moment commentary of the action. The "live" virtual event may be simulcast. Thus, the bettors may watch and wager on "one global sporting virtual event" that occurs at the same time throughout the world, for instance a horse race. Additionally, broadcast systems may also transmit and display data about the events, as well as producing hardcopy material for posters, pamphlets and magazines.

The outcome of the virtual event may be determined by a plurality of factors that include the intrinsic abilities of the competitor, for example, the competitor's training, how the competitor prepared for the event, the competitor's natural predispositions to perform in the conditions presented by the venue, the tactics the competitor has employed for the virtual event, and the competitor's reaction and natural predisposition to react to the events that occur as the event unfolds real-time. For example, for a virtual horse race, in addition to the natural ability and condition of the horse, the outcome of a horse race may depend upon a number of factors, including but not limited to, the training schedule of the horse, the horse's running strategy, the track surface and weather conditions, as well as real-time decisions in the race.

In addition to the characteristics of a participant (horse), there may be a controlling factor imposed by a secondary, but related, participant (jockey). For instance, there are other sports where there are such combinations, such as motor events, where there exists a vehicle and a driver. Since these two components are logically separable, different combinations may produce different results, as in the real world. As a result, the events may be handicapped by the bettors placing wagers, and those who study and understand the form of the competitors can anticipate the strategy and tactics of the competitors, thus bettors can try to predict the impact of the conditions on the competition which may create an advantage over other bettors. The odds of predicting outcomes and successfully winning money increase for a bettor that is knowledgeable of the sport and the contestants. Therefore, successful wagering on these events requires skill and not just pure chance. Thus, for instance, in the case of a horse race, a bettor that has the ability, desire, or skill to analyze historical horse racing data increases his chances of earning a higher return on the money he has wagered. The more knowledge a bettor has regarding a horse, the horse's behavior in a given situation, the track, and the weather conditions, the rider and the trainer, the greater the potential return the handicapper can have on their wagers.

For instance, if a player is knowledgeable of a horse's characteristics (e.g., speed and running style), the horse's bloodline (e.g., is the horse a pacer, does the horse run in front, what of its genetics indicate a horse's desire to win, how quickly does the horse recover from injury, how quickly does the horse recover from a previous race), how the horse has been trained, the horse's behaviors during certain conditions (e.g., how the horse behaves in certain gates, how quickly does the horse get out of the gate, how does the horse behave when against a rail, at what point does the horse usually sprints for the line, has the horse a tendency to run to the lead from the start, run for position in the middle of the pack, and run for the lead near the end or run at the back of the pack making a late run), as well as how the horse races on a specific track (e.g., whether it be New York, Paris, England, Hong Kong and the like), the shape of the track, the length of the race, specific track conditions (e.g., track surface, a dirt track, a turf track, firm soil, soft soil) and in certain weather conditions, increases the player's chances of winning.

Figure 15:
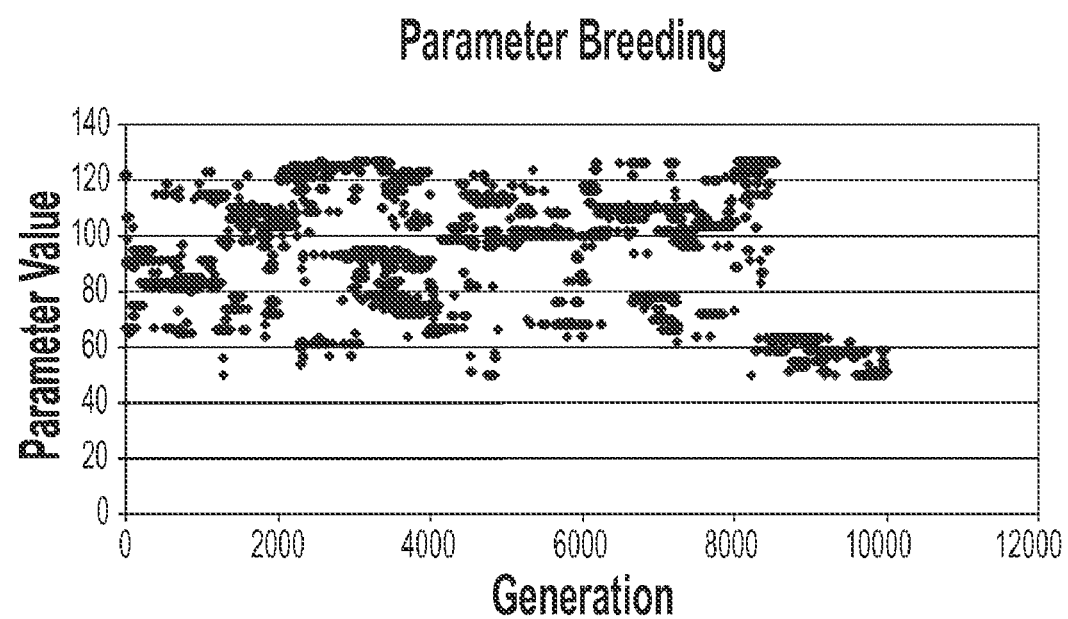

The horse genetics are calculated using genetic algorithms by novel application of well-known prior arts, and applied to the parameters that govern the horse. The horse genetics system is the means by which horses are bred and created in the game world database. The genetics system makes use of genetic algorithms to encode the horse parameters, the steps are outlined as follows; a) Begin with two different horses, with speed, stamina and acceleration, b) encode these three parameters into binary form, c) pinpoint cross over points where binary bits may be swapped at a specified probability for each parameter, and apply this, d) mutate bits at a very low probability, e) create a new horse by averaging the final bit strings, f) finally we rationalize the offspring by ensuring that the values fall within allowed limits. If the horse falls outside of the limits it is discarded, and the breeding process repeated. Once a valid horse is bred, the name selection system uses simple word libraries that are combined in order to generate a new name. Breeding experiments were carried out to see what the results of interbreeding and racing these horses might be in particular the relationship between the performance and parentage, illustrated in FIG. 15. It was found that continually breeding horses using the method outlined created real performance bloodlines which could be tracked, and sometimes random interbreeding lead to genetic dead-ends, as good factors are bred out. Thus selection of breeding pairs was an important factor in any genetics based breeding system. In other words, good horses tended to breed above average offspring, whereas bad horses bred underperforming offspring, when the two were mixed, the result was less defined as you may have traits from both parents. Because the parameter information is never exposed to players, they are able to follow horses by their performance alone, and a clever and observant player may get an advantage by analyzing the bloodline of a horse, over the casual player.

Optionally, the virtual event may include sporting events with famous athletes or competitors in history, or competitors who may never have competed against each other and these may be pitted against one another in a virtual sports contest that is broadcast globally. For instance, a virtual boxing match may be created where Muhammad Ali could be slated to box against Mike Tyson. Alternatively, a virtual horse race where Secretariat races against War Admiral may be provided. The possibilities of the number of virtual sporting events are unlimited. Any famous historical athlete may be placed in competition with another athlete. For instance in tennis, John McEnroe may be placed in competition against Pete Sampras or Serena Williams against Billie Jean King. Athletes famous in one sport may be placed in competition with athletes in a different sport. As long as the characteristics of the sports figure are known, any sports figure can be placed to virtually compete against any other sports figure in any sport. This principle can be extended to any public figure for more appealing variation, for instance historically important world leaders riding against each other in the Grand National.

The virtual event software may be integrated into existing pari-mutuel event wagering software, which are utilized in venues such as a casino, horse track, advance deposit wagering company, off-track-betting agency, and the like, using defined software based interfaces (APIs). This may minimize the learning process for the end-user/player when the virtual game is launched for the first time. An API may also provide a means to query the game world so that other applications that need to access and display the data can be built or integrated with partner sites.

Also, an optional dynamic flash interface may be used that can be launched, for instance, on a partner's website. The interface may integrate both data and betting facilities into one place so that bettors can have a self contained experience.

The figures described above show one physical element to perform a function, but it is understood that the functionality can be divided between one or more similar elements to share the responsibilities of the function to be performed, as is well known in arts in this area of practice.

The structure of the system and methods of the present invention will be explained in reference to FIG. 1. A virtual world engine 10 includes a game database 101 that stores all the attributes that comprise each virtual game world and its inhabitants. The virtual game world can be implemented using an enterprise database server, such as Informix Dynamic Server (IDS). Such a server can support high concurrent usage and enable the game database 101 to store millions of points of information about the world and events that makeup the world. A game simulation module 100 can produce all the data points necessary to make a virtual game world and these data points are stored in the game database 101 which form the virtual world engine 10. If there is more than one game simulation module 100 responsible for running a part of the virtual game world, the other game simulation modules interface with other modules by exchanging data via the game database 101.

The virtual event engine 20 may include a scheduling module 102 that responds to virtual events created between competitors existing in the virtual game world, and based on event data created in the virtual world engine 10 make a video representation of the event. As part of the virtual event engine 20, the scheduling module 102 will run program timelines with event data, adverts, and information for players so that play out is achieved 24 hours a day and 7 days a week. The scheduling module 102 may run several automated timelines, with different periodicity between wagering events. For example, there may be a 2-minute timeline, a 6-minute timeline and a 20-minute timeline, and the timeline can be any length between competition events. Additionally, the scheduling module 102 can be configured to describe and display special events analogous to real world gatherings, such as the Kentucky Derby and the Breeders Cup. The scheduling module 102 may also incorporate a game grading system for individual competitors. For instance, in horse racing there are maiden races, and thoroughbred races, and events are graded so that horses of peer ability race against each other.

In pari-mutuel based wagering events, the morning lines (or suggested probabilities/odds) are created by estimating the relative performance of the competitors by historical data analysis to create initial suggested odds for the event. The lines are then delivered or made public to the betters before the race begins as a guideline predictor of the potential outcome. However, the actual odds/payout will fluctuate as betting activity changes the pool against individual competitors. In order to facilitate pari-mutuel wagering, the virtual world API 105, delivers historical information to bettors, which allow them to make certain judgments about the potential performance of competitors in an event, and therefore how they should place wagers. Such information provided includes, but is not limited to: a) last 10 wins, places and shows, b) last 10 wins, places and shows on a particular surface, c) breeding and genetic heritage, c) positions, times and speeds for previous races, d) quarter times, positions and speeds for previous races, e) jockey and trainers for previous races, f) surface, going and race conditions for previous races, g) trap position for previous races, h) rating value, calculated by par time comparison for a particular track.

Figure 4:
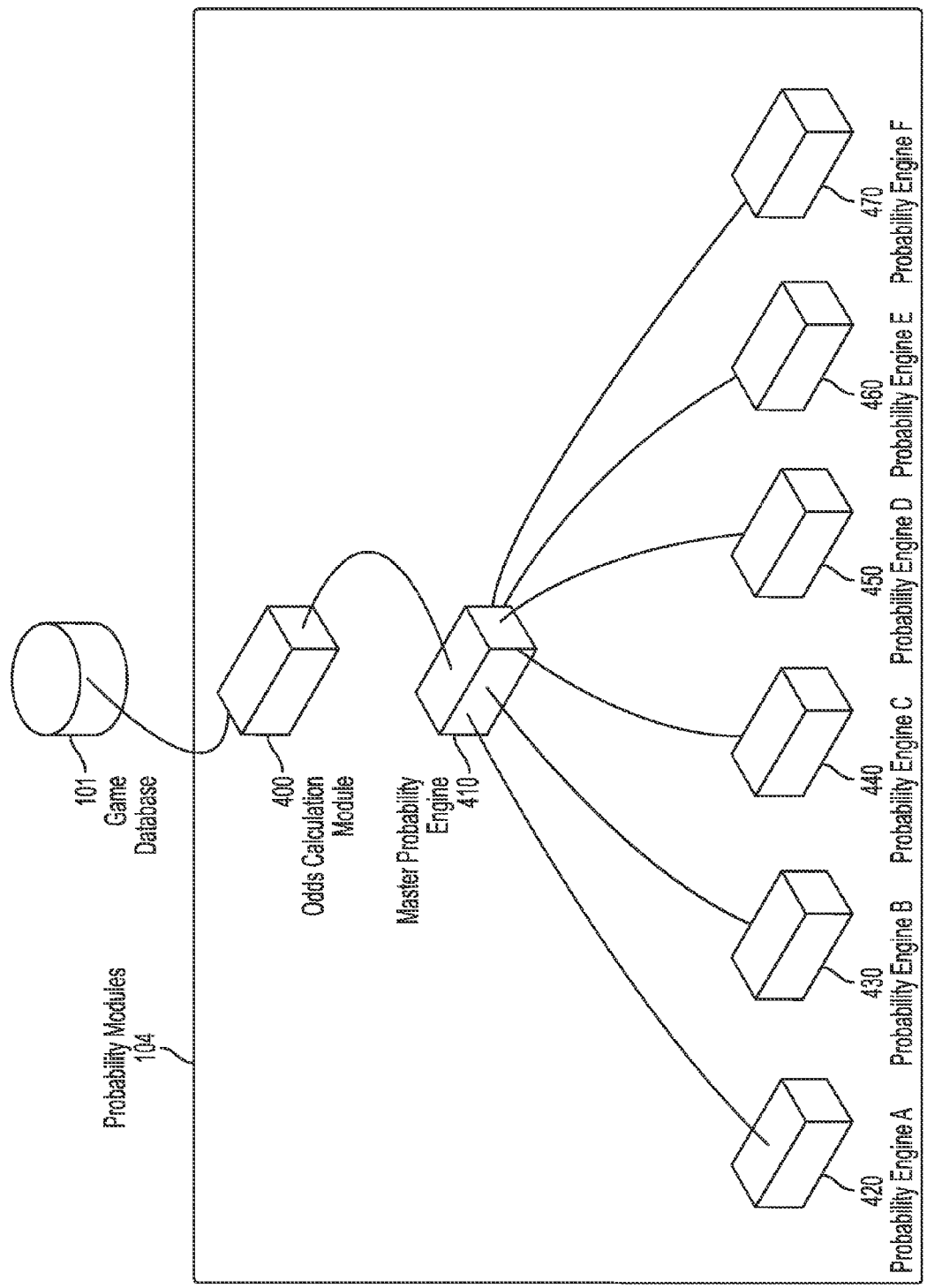
FIG. 4 shows the architecture of the system to rapidly create probability data for virtual events that is usually used in conjunction with fixed odds betting FIG. 5 show the output of the video production systems FIG. 6 show the output of the graphical overlay systems FIG. 7 show an embodiment of the system serving data to visual displays online, and in casinos and betting shops.

For fixed odds wagering, and to support partner bookmakers, a probability module 104 is capable of creating real odds against virtual game events for utilization. The odds offered on each event are calculated by a unique method. Before an event is due to be displayed in real time to the public, an array of probability engines slaves, as shown in FIG. 4 may simulate the event thousands of times using different random factors injected each time into the event run. The data from the simulated events made in the probability engines slaves can be sent to a master probability engine 410. After thousands of runs, a probability distribution or odds may be created for the event in the odds calculation module 400. All the outcomes assembled in the master probability engine 410 are processed and used to produce the odds for each of the events. The number of times needed to simulate an event to produce a useable set of odds depends on the complexity of the event. For simple win place and show events, it can be shown that a relatively few runs are required to secure statistically valid or useable odds. For more complex odds, such as exacta and trifecta, more runs may be required to obtain statistically valid odds because the number of outcomes is increased. This process has been proven to produce accurate odds by means of Pearson Correlation analysis of sets of results of different run sizes. The probability system is a distributed process allowing for very fast simulation of events in adequate time before the event is due to run in real time for public display. The optimum number of runs is determined for the time allowed before an event is to be displayed to the public to produce the result, and weighed against the precision or validity of the outcome desired and is called a configuration preference.

Figure 10:
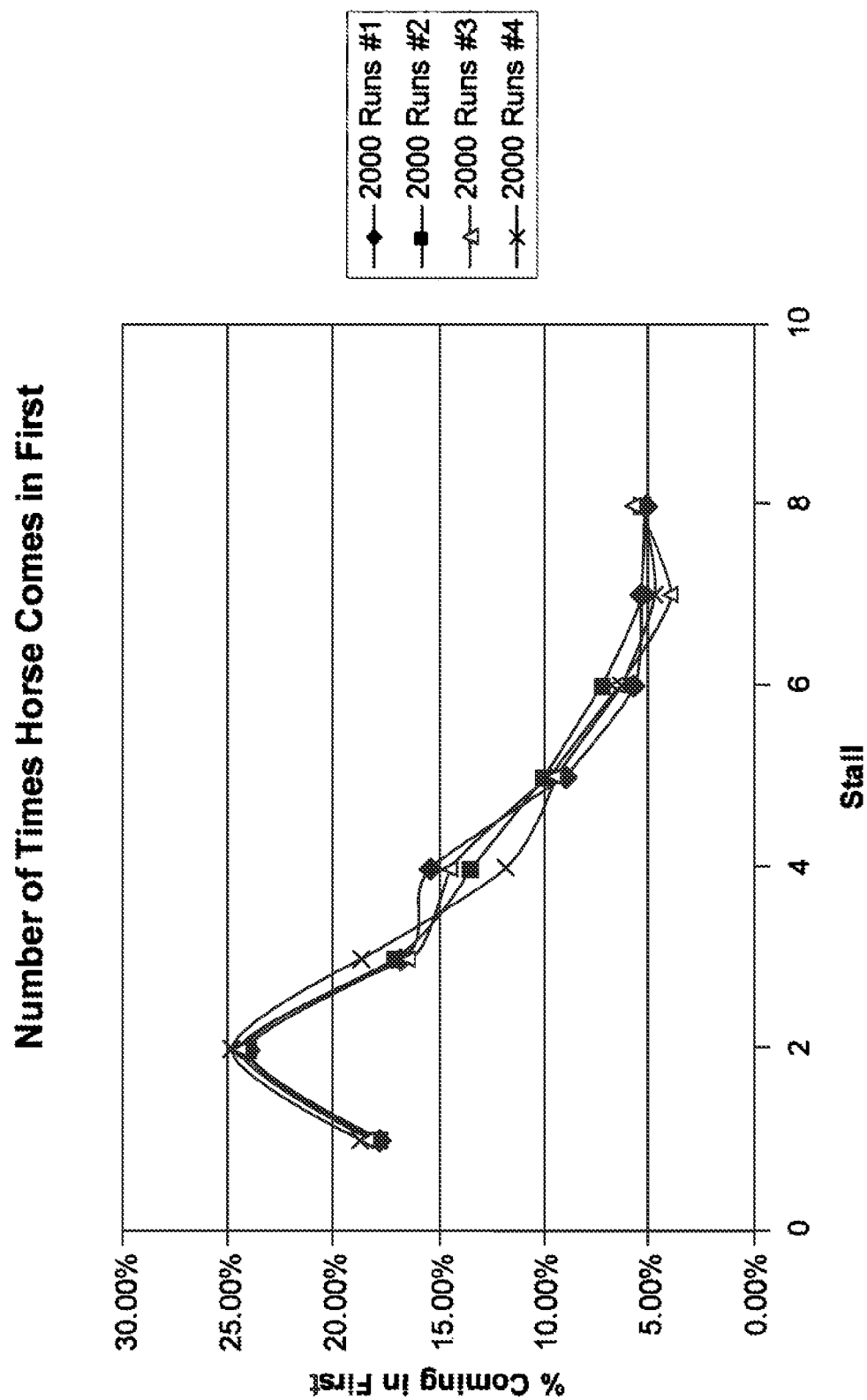
FIG. 10 show the output of the probability system

FIG. 10 shows the graphical results of running 2000 simulations on a single event, repeated four times. The graph shows that there are definite trends in likelihood of a particular horse winning; these are due to the deterministic characteristics of the simulation and the algorithms applied to create an event, i.e. the horse parameters, attributes, and the race conditions. The variation seen in FIG. 10 between each of these run sets represent a degree of uncertainty introduced by the random elements and the application of the algorithms. The data shows that the probability of a horse achieving first is predicted within a few percent for each set of 2000 races. If this was a purely random event, the probability over 2000 races for any horse coming in first would be equal when the number of runs computed are statistically valid, and there would be no tendency for one horse to win.

An example of the probability distribution calculation for a fixed odds event follows:

a) The master probability engine 410 loads each event from the game database 101 according to the upcoming race schedule in the scheduling module 102 for all the events scheduled for a two period;
b) Each event data set (competitors, parameters, track, etc.) is sent to the probability engine slaves, of which up to ten or more can be simultaneously attached to the master probability engine 410;
c) Each probability engine slave then simulates the race N times, where N is a configuration preference, and sends the results back to the master probability engine 410;
d) The master probability engine 410 then collates the data results for each event, and may request another N simulations from the slaves to improve the odds validity. The master probability engine 410 can make requests simultaneously to all connected slaves, or can make requests in the many well known methods in this area of practice, such as round robin, etc. This means the calculation can be a linear relationship to the number of probability engine slaves connected and the capacity of the network;
e) When the master probability engine 410 reaches M simulations, where M is summation of N and is the final configuration preference then the result data is stored in the database. The result data consists of the position of every competitor as they cross the finish line;
f) The result data is then parsed by another process to calculate the fixed odds for win, place, show and exacta outcomes with a specified take, or any of the well known wagering types in the gaming practice; and
g) The master probability engine 410 then moves onto the next event in the schedule.

The game simulation module 100 and the simulation module 103 may generate the outcome of events between competitors in the game world, and may be triggered by the program schedule module 108. All the necessary data to start the simulations may be requested from the game database 101 in advance by the program schedule module 108 and passed to the game simulation module 100 or simulation module 103. The simulations in the probability module 104 are a combination of artificial intelligence (AI) decision-making systems, and rules and constraints are coupled with stochastic variation. Competitor seek decisions are algorithms that affect the competitors tactics and tendencies. A competitor enters a competition with some clearly defined goals that it will try to stick, but the rules and constraints of the event are followed. Rules and Constraints govern the virtual competitor behavior during the event. Variations are algorithms that inject a small variance around a perfect outcome. A perfect outcome is defined as the best solution to the algorithm to meet an objective; variations will reduce the likelihood of reaching the perfect outcome, and therefore the objective, and ensure varying outcomes of an event. Multiple variable vector computations are performed for each competitor for each frame that makes up an event. The algorithms compute each piece of data to make a frame for each step of the race until the race is finished. The algorithms compute numerous values for each frame of the event based on the numerous variables required to compute each algorithm. Each rule, constraint, and variable and their interrelations with other rules, constraints, and variables are governed by an algorithm. The decisions, goals, rules, and constraints for events with competitors that compete to finish first around a track are the same for all competitions of this type. The decisions, goals, rules, and constraints for competition events other than racing around a track are similar to those described below in more detail. However, the deviations, differences, and types of variables in other types of competition events are well known and the probability distribution or odds calculations can be applied to other competitive events. The techniques described can be applied to other simulations of many types of events in order to calculate probabilities of a particular outcome.

Figure 14:
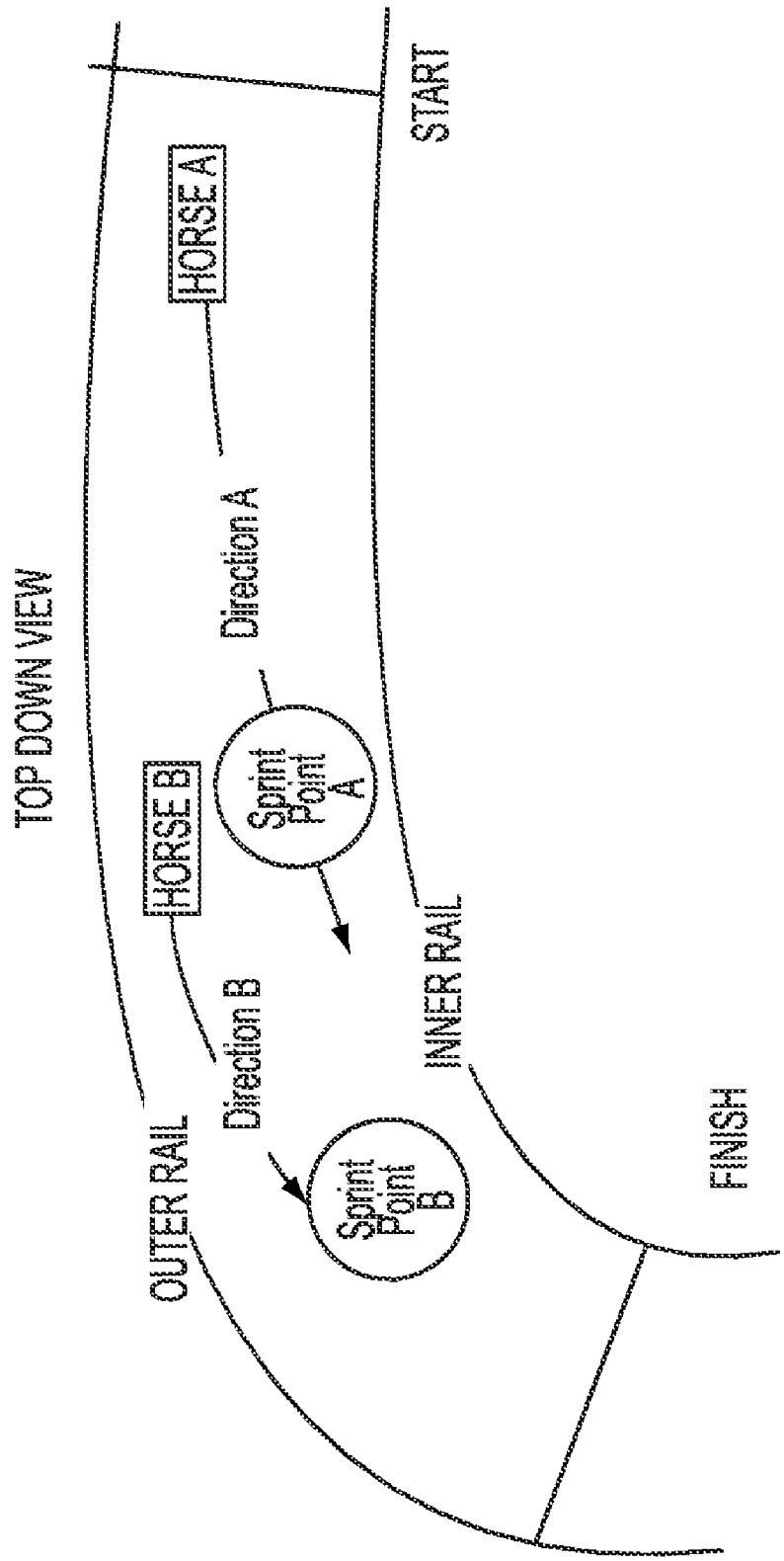

To define a race simulation there are two primary entities, summarized in the next two paragraphs, and examined in detail in the subsequent paragraphs.

a) A track which is defined as a set of splines which the simulator uses to calculate the bounds of the simulation, and points along the track that are important, like the start point, end point, bounding curves, and racing lines. The start point is where the gates are set, the end point is where the finish post is set, the bounding curves correspond to the rail boundaries, and the racing line corresponds to the optimal line around the track. Each track is a different shape and completely defined in 3D space. These boundaries are used as inputs in the simulation to ensure competitors stay within the bounds of the track, and run from the start point to the finish point. This is shown in FIG. 14. Additionally a track will have a surface with a condition that has been defined by accumulation of weather effects. Within the Virtual World, if the weather is wet then the track becomes progressively wetter, if the weather turns fine, then the track dries out. This is modelled as a sliding scale of wetness to dryness, and this value of wetness to dryness may impeded or help competitors, who have a favoured value. The variation is modelled as a penalty that is proportional to the difference between the actual wetness of the track and the competitor's affinity for a particular wetness. This is commonly termed 'going' of a surface.

b) A competitor that is defined as an entity with a maximum acceleration, a maximum speed, stamina, a tactic, and a consistency. Stamina is a definition of a competitor's fuel. The more stamina a competitor has, the more fuel it is able to expend, fuel is expended whenever a competitor manoeuvres. More stamina is used for more complex manoeuvres. Maximum acceleration is defined as the maximum rate the competitor can change speed; if a competitor changes speed faster then it uses more stamina. Maximum speed is the maximum achievable speed, if a competitor travels at this speed; it burns stamina at an increased rate. A competitor will have an optimum speed for the track, at which its stamina is burnt at an optimal rate in order to reach the finish line and have zero stamina left. In practice the speed will not be optimal, because the competitor will be forced to make manoeuvres in order to change or be consistent with its tactic, avoid other competitors and keep away from track boundaries. This means that the stamina is changed, and the competitor must continually re-evaluate how best to burn stamina in order to complete the race. Consistency controls how much random factors can affect a horse's performance during a race. Less consistent horses have a potentially larger variation of algorithm outcome, and potentially larger penalties, than more consistent ones. A competitor will have preference for a surface and a preference for a surface condition (going). This is modelled as a penalty that applies if the surface and conditions are outside the competitor's preference. There will obviously be a group of competitors for a given race.

Competitor Seek Decisions are variables or choices that competitors make while the competition is being run or conducted and these effect the outcome of the competition. For example, with a horse competitor: a) The horse will try and stay close to the racing line, as this defines the most efficient way around the track; b) Horses will try and get to the inside rail, this is associated with the racing line; c) The horses will try to avoid other horses, by either braking or choosing a passing trajectory; d) Horses will try and maintain their chosen tactic, whilst balancing their stamina usage; e) At their sprint points, horses will try and move laterally away from other horses in order to have a clear line of sprint for the finish; f) Horses will always try to get to the finish line.

Competitor Rules and Constraints are limitations placed on a competitor during an event. For example, with a horse race: a) Horses cannot pass through or collide violently with other horses; b) Horses cannot pass outside the track bounds; c) Horses must run from the starting line to the finish line in that direction; d) Horses cannot fly; trajectories are limited to the plane of the race track; e) Horses cannot burn more than their stamina usage; f) Horses cannot accelerate faster than their maximum acceleration; g) Horses cannot go faster than their maximum speed; h) Horses cannot exceed their maximum turn rate (for directional changes); i) Horses cannot exceed their maximum turn angle, from their trajectory.

Variations of a value in an event can fluctuate each time competitors' values are computed to determine the next frame of the event as the event proceeds. In a race where variation is applied to an outcome, a 1% variation means that there can be between 0 and 1% variation in the outcome variable related to the event. A 10 unit variation means that a calculated point can be within 0-10 units on either side of the actual point value. It is important to note that these effects can be applied to each frame, every other frame, or many other well known groupings in the arts of frames that makeup a race. Typically a race will have about 1500 frames, and though the variations at first glance can be very small, these effects can accumulate or cancel each other out during the race as a whole. Another important point is that variation is usually a small percentage of a simulation parameter, and as such does not necessarily define the outcome of the event as a whole.

A virtual competitor estimates or analyzes its speed at every frame to decide what speed the competitor should be going to achieve its tactical goals. The speed estimation is modeled as a small variation around the perfect speed of the competitor calculated by the algorithms. For example, the speed needed to maintain a steady pace in the pack by a horse can be expressed as a function, such as Desired Speed=f (Horse Perfect Speed, Horse Consistency, 1% variation), and the speed needed to catch the leader, the Leader Catch Speed=f(Race order, Range to Leader, and plus or minus up to 1% variation).

Figure 11:
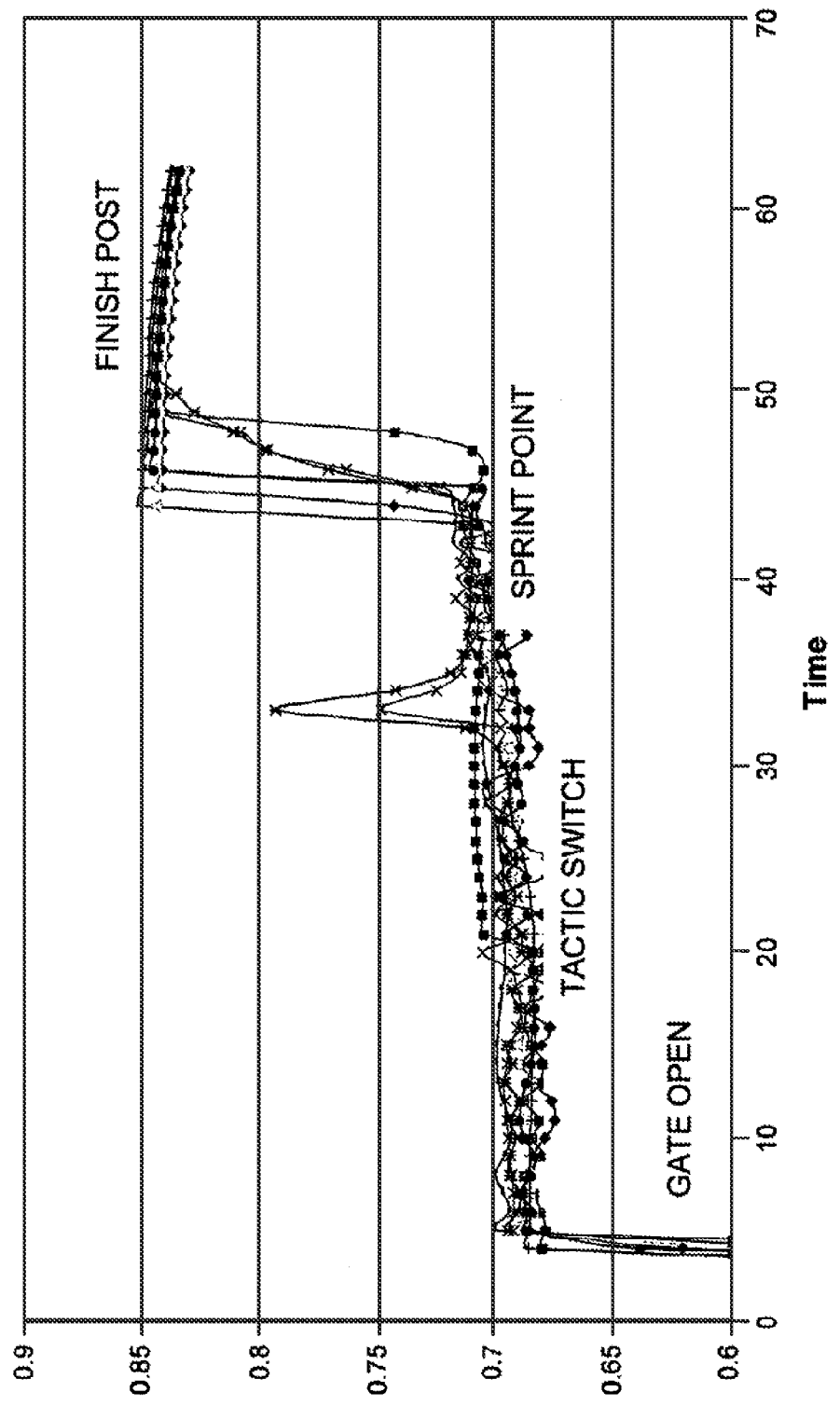
FIG. 11 show the variation of competitor speed during an event
Figure 12:
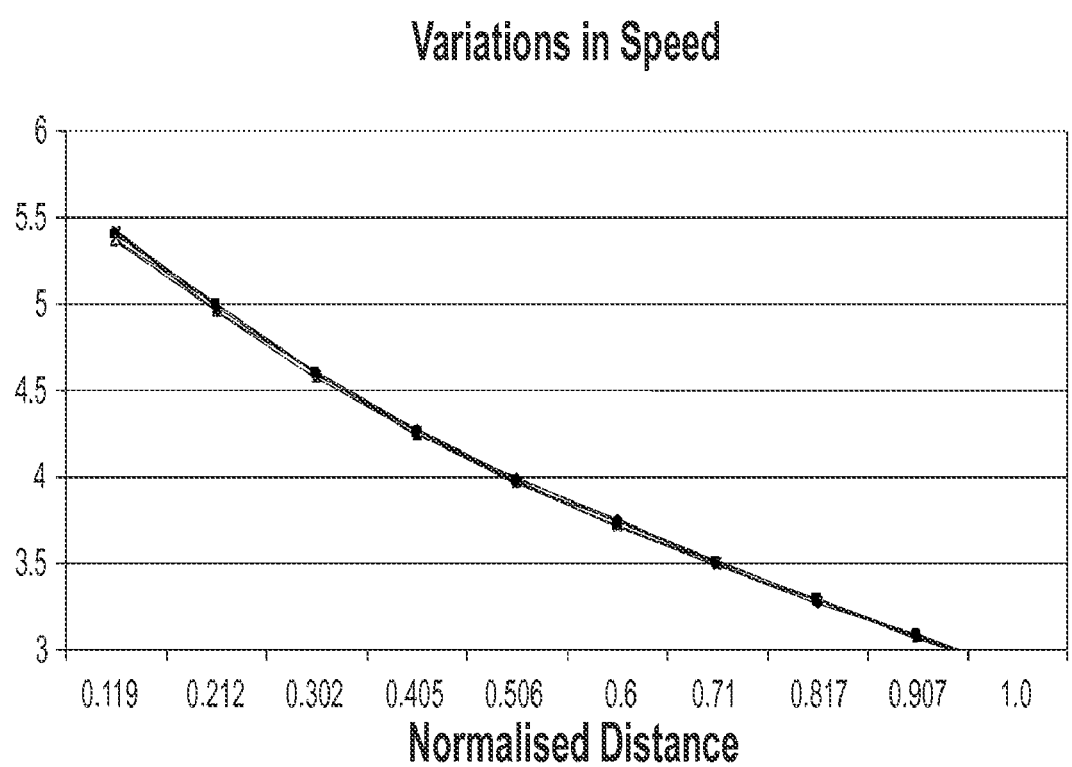
FIG. 12 show the variation of speed calculation

The graphs in FIG. 11 and FIG. 12 show the variations in the outcome of the algorithm at a particular frame, calculated during the progression of the race. There are minute differences in the estimated and actual speed needed in any particular frame, thus horses with lower speed consistency will find slightly more deviation, than horses with more consistent speeds.

Estimation of range or distance between competitors is computed. For example, a horse competitor calculates his range to the leader for every frame to decide how far away other competitors are in comparison. The range value will affect other algorithms. For example, if the horse is going outside its chosen range, the algorithm that controls the acceleration of the horse will increase the horse's pace so the horse can try and make up the difference. The leader catch range is function of f(Race order, Distance, Perfect Speed plus or minus up to 1% variation)

A tactic switch is a decision based on whether a competitor should change their competition strategy. For example, if a horse should switch its tactic to following the leader, being the leader, or staying in the middle of the pack. This is calculated once at the tactic switch point for the horse with the function TacticSwitchPoint=f(Switch point plus or minus up to 1% variation).

Sprint point is the point at which a competitor uses extra energy or strength to improve their position immediately near the end of a competition. For example, the degree the horses sprint for the finish line, and there is a small uncertainty when a sprint point begins for a particular horse. A sprint point can be expressed as the function SprintPoint=f(Sprint point plus or minus up to 10 units variation)

Start delay is the delay a competitor experiences when starting a competition. For example, a horse experiences delay getting out of the gate. In practice, this is up to 1 second of fumble. Start delay can expressed as the function StartDelay=f(start delay maximum plus or minus 1-100% variation)

Penalties are assigned to competitors. For example, some horses are penalized some degree before the race begins. All penalties are a function of the horse's consistency and include a small variation of up to 2%, together with another penalty related to the conditions of the race. Maximum achievable speed is expressed as a function by f(Inherent Maximum Speed plus or minus up to 1-2% of Inherent Maximum Speed variation, Going Penalty). The going penalty is a penalty intrinsic to the competitor, which is applied if the competitor does not find the going conditions favorable. Going is modeled on a sliding scale between 0 and 100, where 0=wet and sloppy and 100=dry and firm. A competitor will have a perfect going value inside this range, deviation from this perfect value, will cause penalty to be applied to this speed function.

Stamina Usage is the rate at which a competitor burns their required fuel to compete during a competition. For example, a horse uses stamina during a race, stamina is like fuel, and the horse will try to keep the fuel burn rate low so that it can complete the race efficiently, whilst maintaining its tactics. Stamina is burned faster if the horse is attempting to go faster or accelerating than when the horse is maintaining his ideal cruising speed. Stamina can be expressed as a function by f(Speed, Perfect Cruising Speed) and Perfect Cruising Speed=f(Actual Perfect Cruising Speed plus or minus up to 1-2% variation). Thus a competitor's behavior is emergent from its circumstances in the race, and from the small random effects that are applied to it as it moves through the race.

A virtual world API 105 may provide a means for other external systems to obtain information about the game world, the competitors, and events within the world. A virtual world API can use XML as a data container and to deliver information over the Internet. The virtual world API 105 may deliver historical and current data about competitors and their events. The virtual world API 105 can be interfaced with automatic Portable Document Format (PDF) generation systems, web systems, and point of sale systems. It is by this means that information required for pari-mutuel and fixed odds wagering is provided to players.

Figure 3:
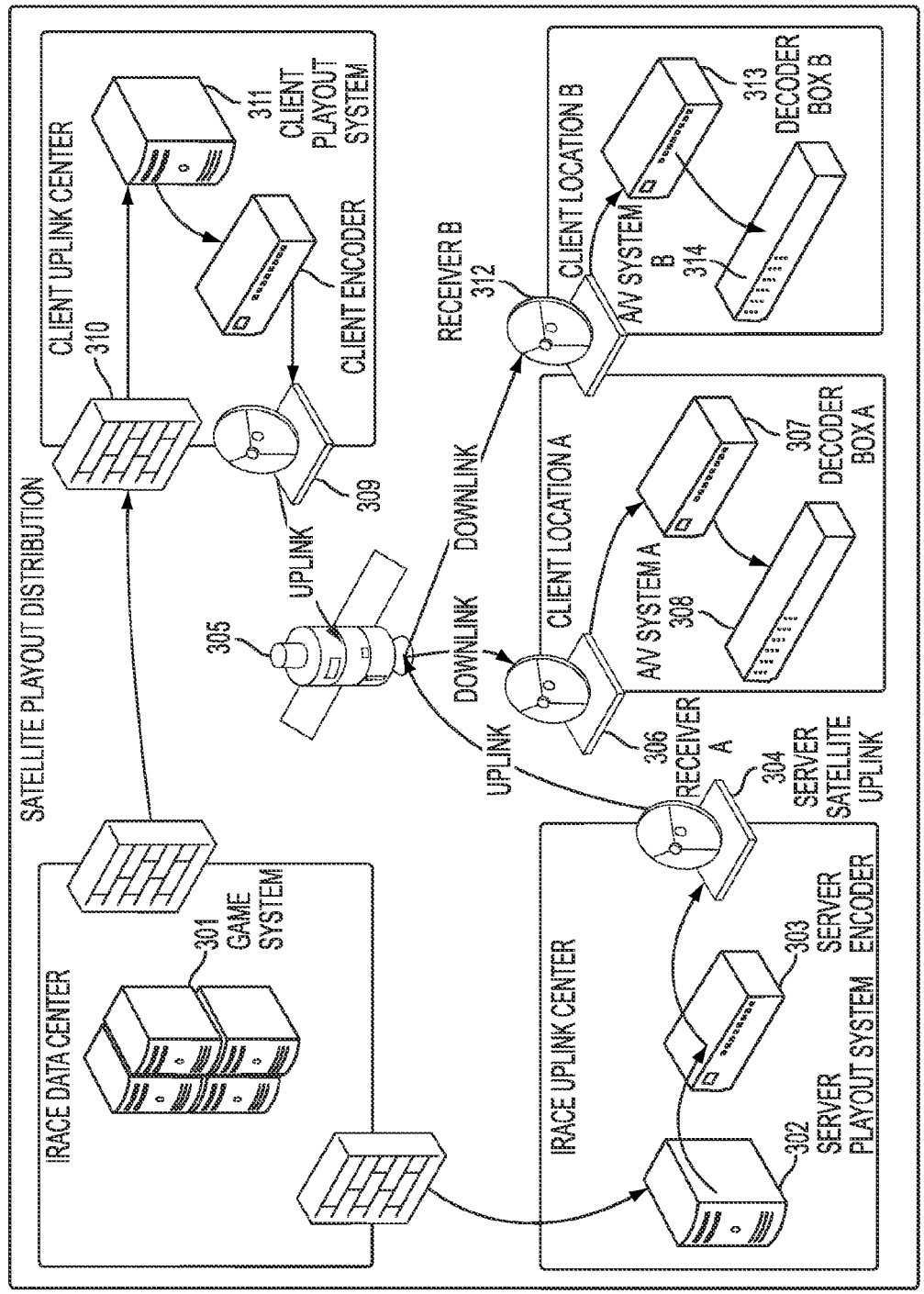
FIG. 3 show an embodiment of the system serving satellite-based transmission of virtual event video.
Figure 13:
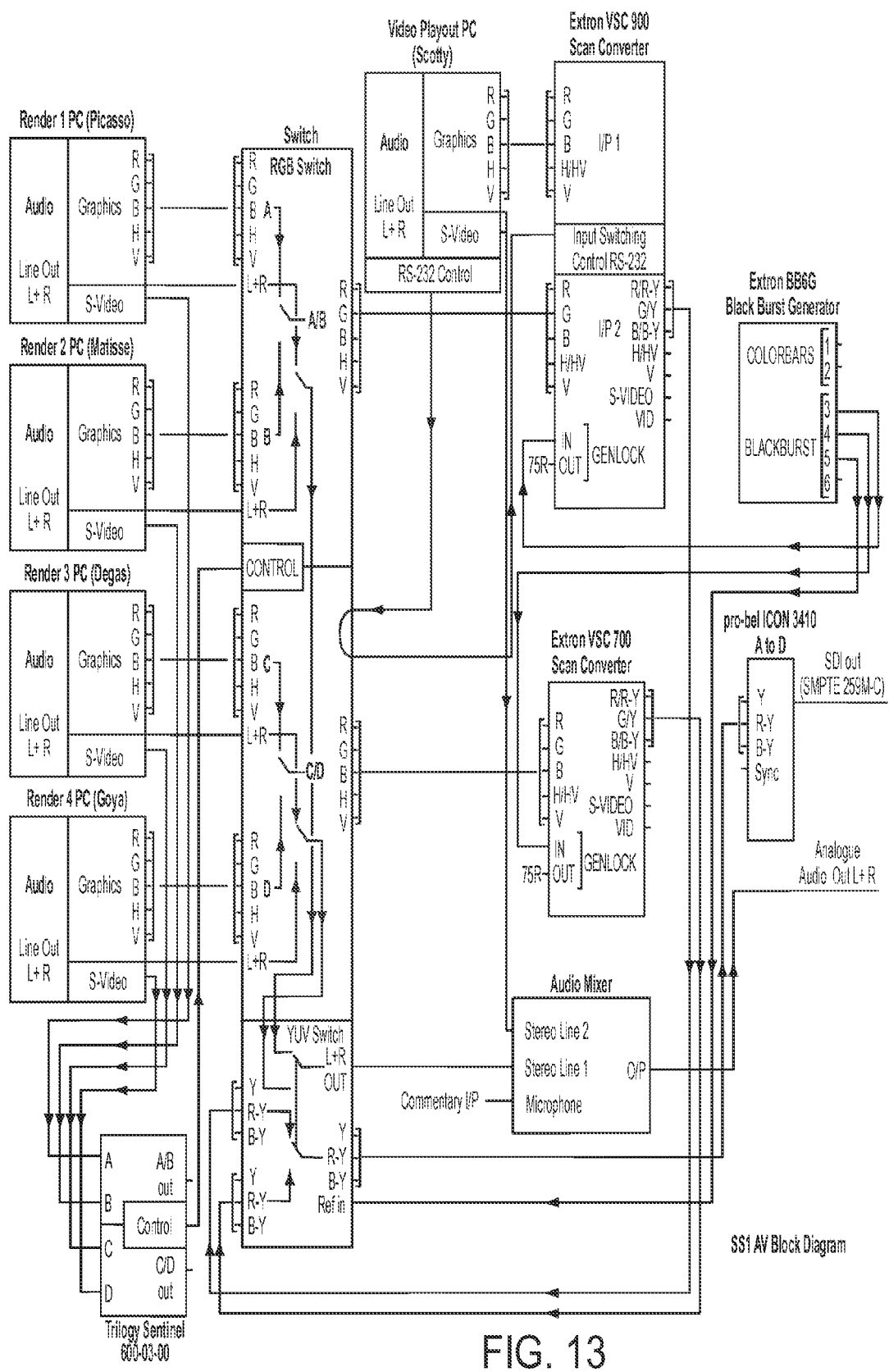
FIG. 13 show the automated video switching system for the dual redundant video system FIG. 14 show the conceptual track boundary in the simulation model FIG. 15 show the results of breeding virtual horses over several generations

A virtual broadcast engine 104 may contain a video generation module 106 that may include a self-contained video rendering, playback and caption generator that can be written in software. The virtual broadcast engine 104 can produce high quality video for delivery to any medium such as Internet web streams, TV, mobile 3G, high definition displays, and broadcast systems, such as satellite 305, and in a pure audio form, such as radio and internet audio stations, an example of which can be found in FIG. 3. In the virtual broadcast engine 104, a video redundancy module 107 may provide dual redundant video switching technology that is uniquely integrated with the video generation module 106. This integration allows the video generation module 106 to communicate with the video redundancy module 107, to provide information that can be used to determine whether or not a switch to an alternate video stream is necessary. Such conditions may be a failure in the software, a failure in the hardware, or unexpected behavior in the operating system. Well-known art in the video switching area of practice may be used to ensure continuous uninterrupted delivery of video. Video hardware design may be used to allow the system to be monitored throughout the broadcast, as shown in FIG. 13. A program schedule module 108 may be used to ensure that virtual game world events are played out at the appropriate time on the video channels. The program schedule module 108 controls the program timeline and also controls all captions and interstitial material. Interstitial material is video, text or graphic images that are displayed before an expected content page. The program schedule module 108 may use distributed technology to allow components to be run on separate hardware platform providing a means of graceful degradation of the system.

Sufficient time before an event is to be released to the viewing public, the program schedule module 108 requests the simulation module 103 to make an event data run with initial parameters of the competition to be provided by the game database 101. The event data is forwarded by the program schedule module 103 to the video generation module 106 that is then delivered to the viewing public.

The program schedule module 108 also forwards the event data to the game database 101 to be stored for future reference. Past virtual event data is stored for all the competitors and for all the events. The past virtual event data can be discovered by bettors or published.

Figure 5:
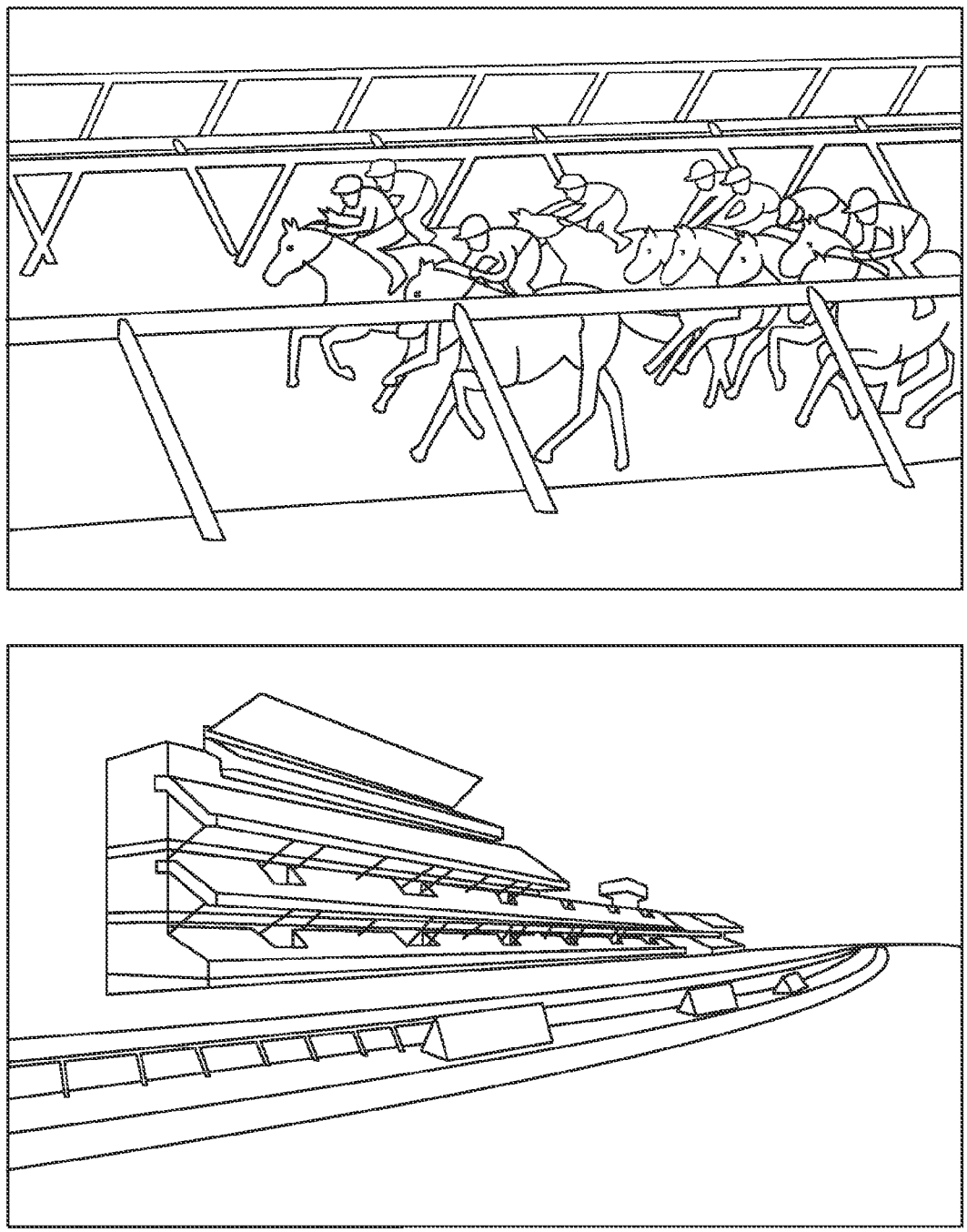
Figure 6:
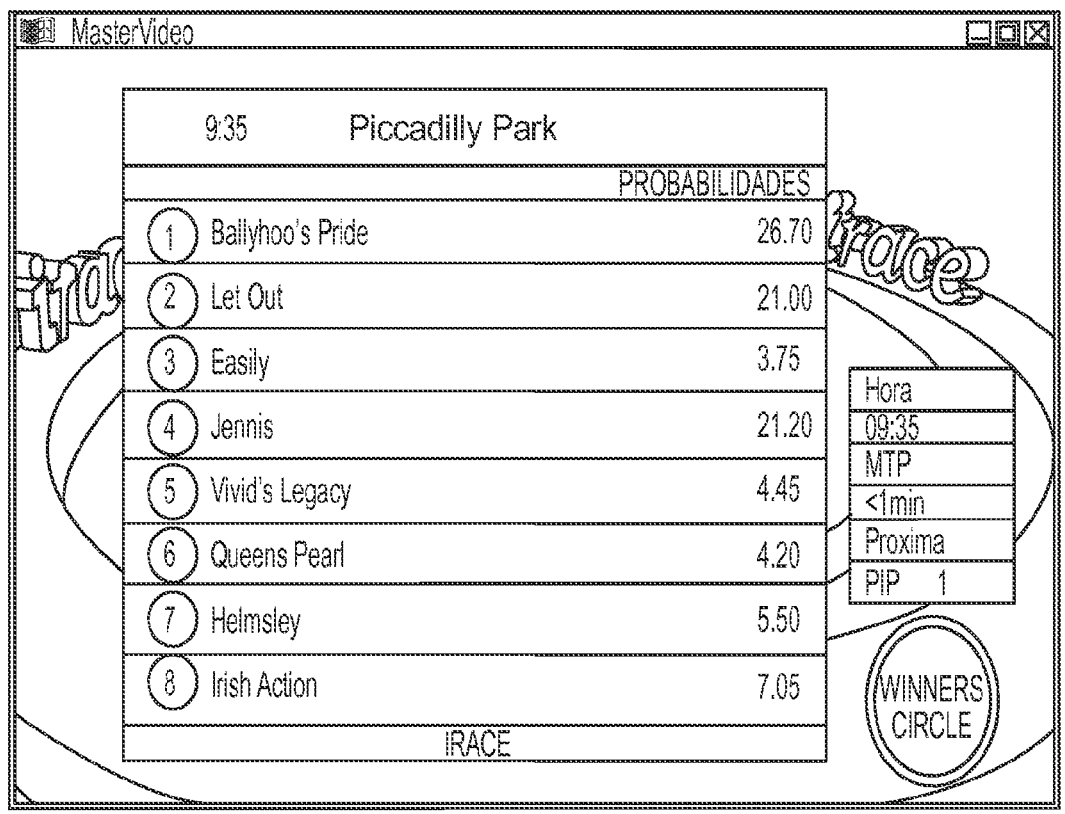
Figure 7:
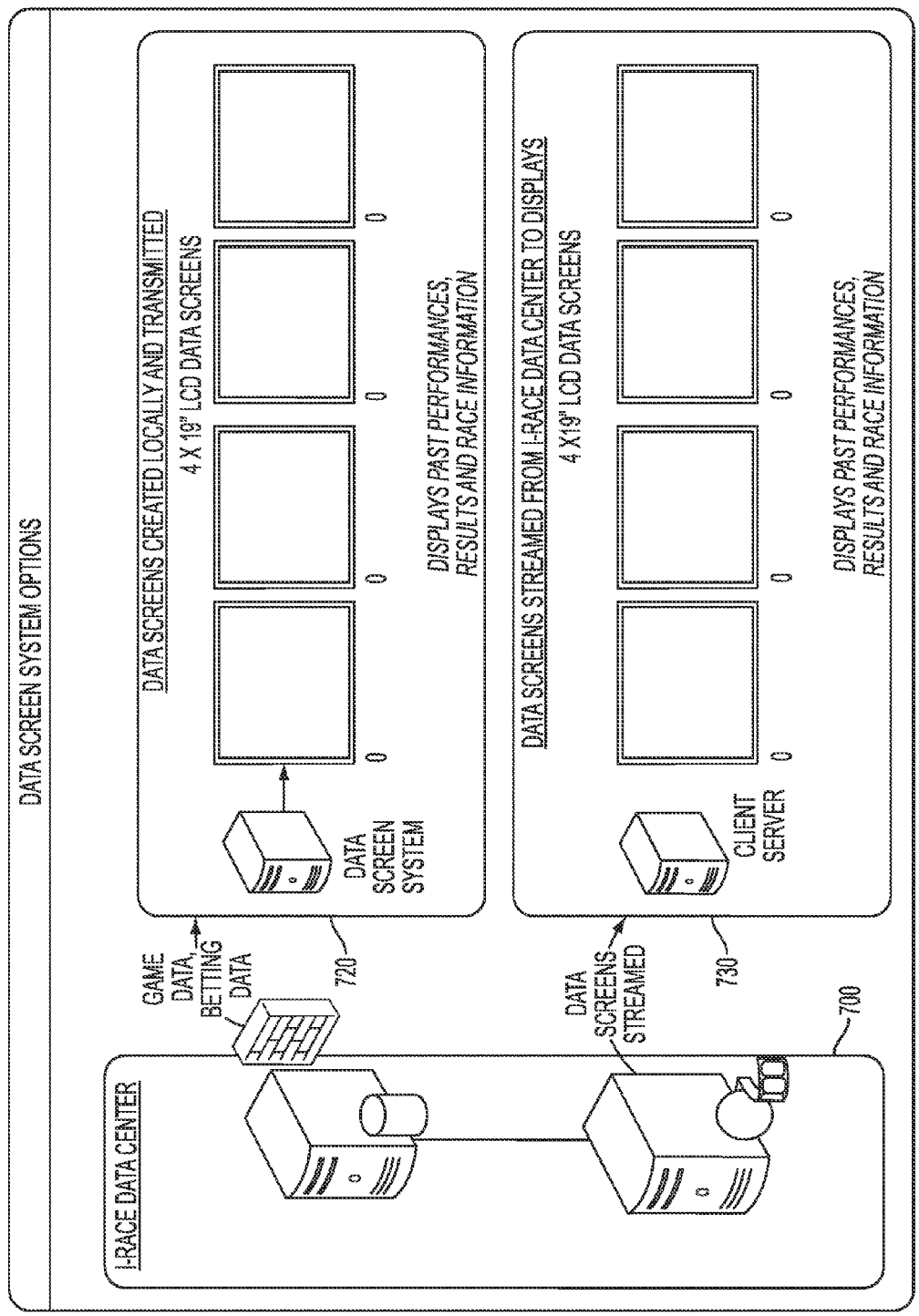
Figure 8:
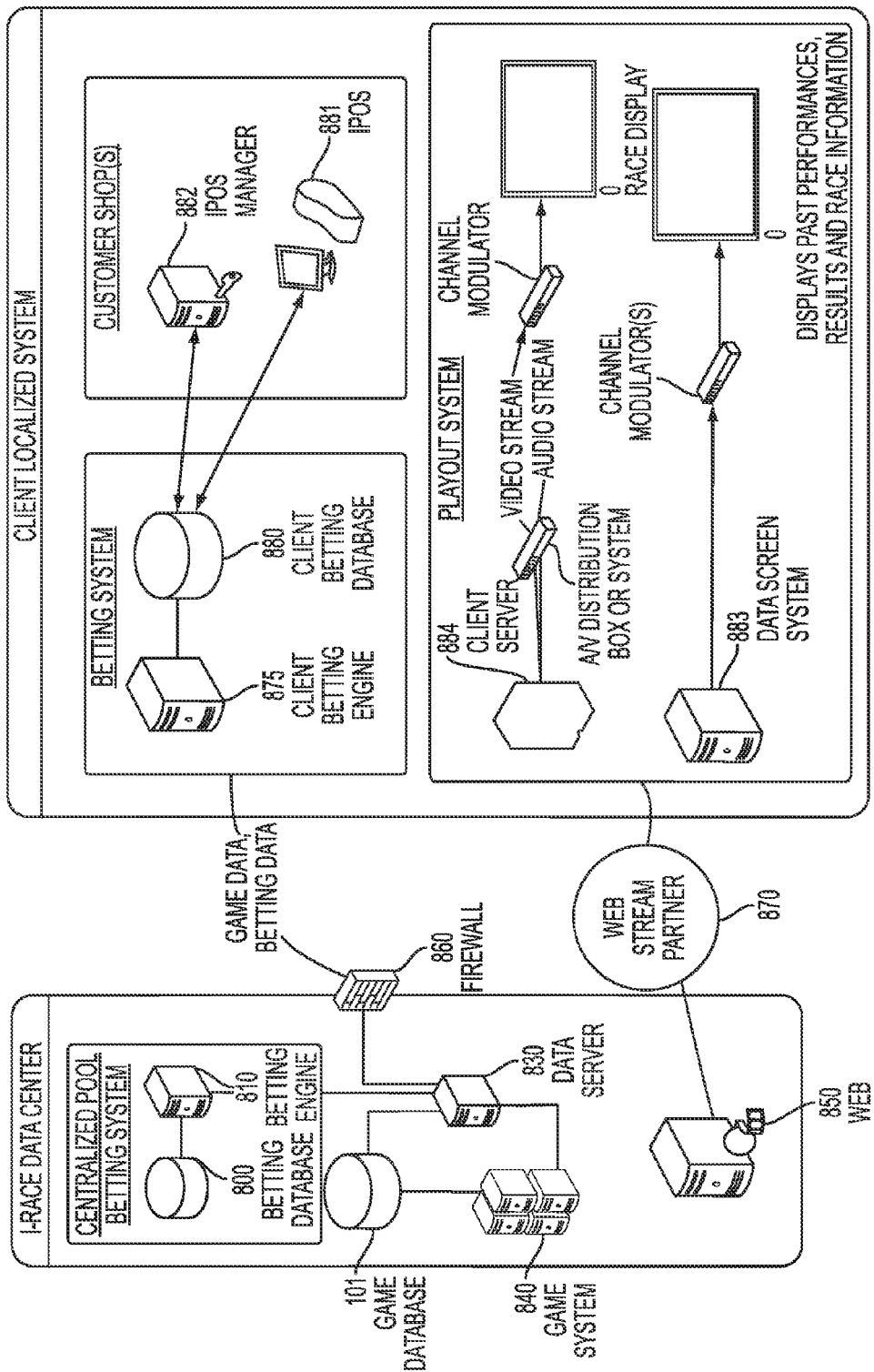
FIG. 8 show the customer based betting systems

An interstitial simulation module 110 may create relevant interim material to watch in between game world events. The interstitial simulation module 110 may be triggered by the program schedule module 108 to produce views of the venues and candid shots for instance. A remote video delivery module may be used to deliver high definition video, for example, 1024×768 at 25 frames per second to sites remote from the virtual game world systems. The remote video delivery module can deliver the high definition video that requires a bandwidth of less than 20 kbs over the Internet. Remote video delivery modules can be used to drive high definition displays, as seen in FIG. 5 and FIG. 6, as well as satellite, cable, telephone networks, and other broadcast channels.

A remote data delivery module can receive data from the virtual world API 105 to display information about the game world and game world events continually in an aesthetically pleasing fashion. The remote delivery module can deliver video data to local TV displays, personal computers, servers, and display terminals throughout the world. An example of a remote data delivery module is illustrated in FIG. 6. A data screen system 720 may be responsible for retrieving relevant event data from a web streamer 113 that will be shown throughout a local or remote location on various LCD data screens. Players may use these screens to read information on upcoming races, past results, and past performance data.

An audio module 109 may provide a method of delivering realistic race commentary in any one of several languages, including Russian, Portuguese, French, Spanish, English and Mandarin. The system is designed to allow new languages to be added and copes with unusual grammar construction by using a grammar template language and audio sample library.

Figure 2:
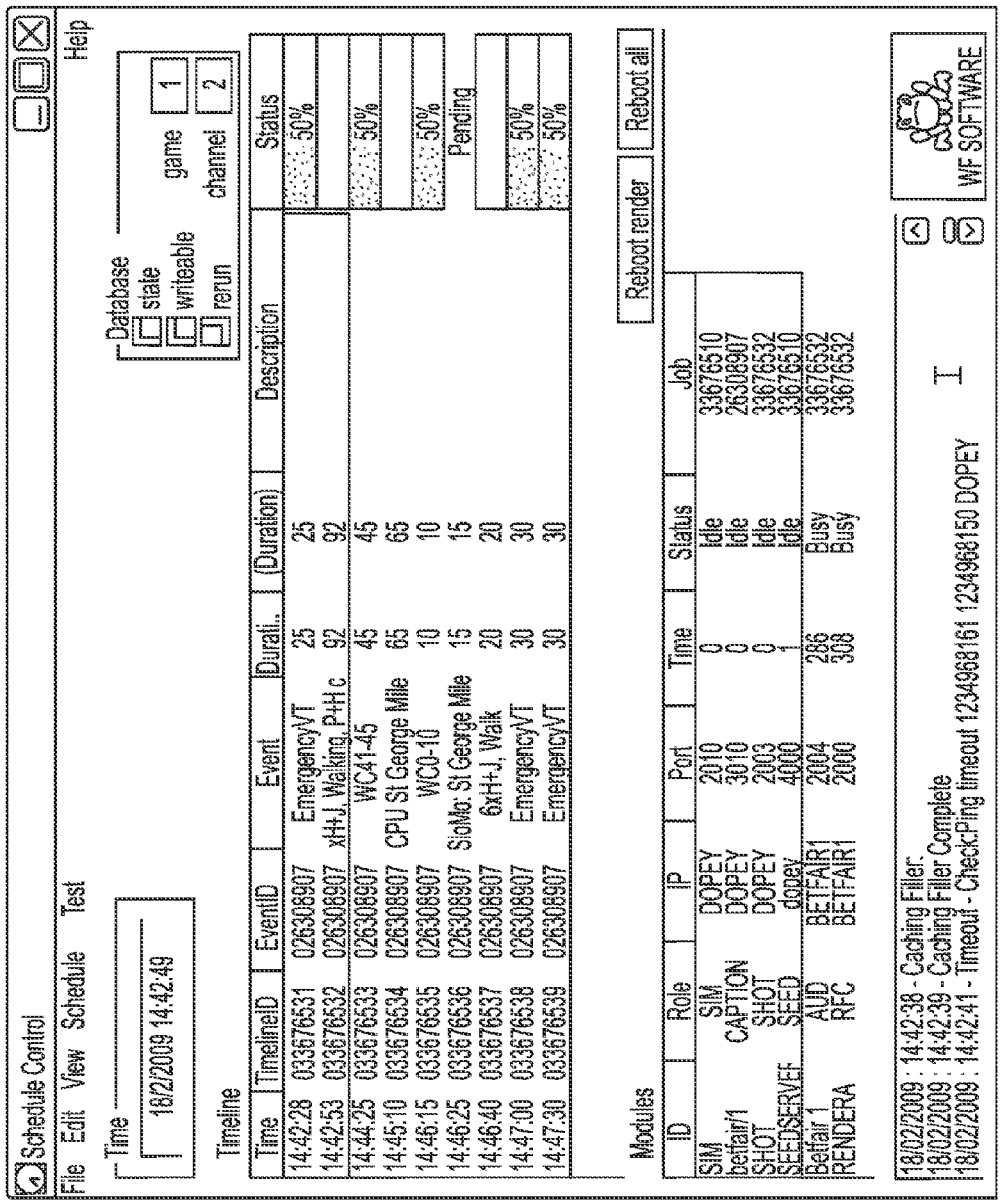
FIG. 2 shows a schedule of events generated inside the virtual of world, it is by this means that the events are distributed to visualization products.

The integrated betting system is shown in FIG. 2 may integrate seamlessly with the virtual game world and its events. The system may offer pari-mutuel as well as fixed odds betting facilities.

Figure 9:
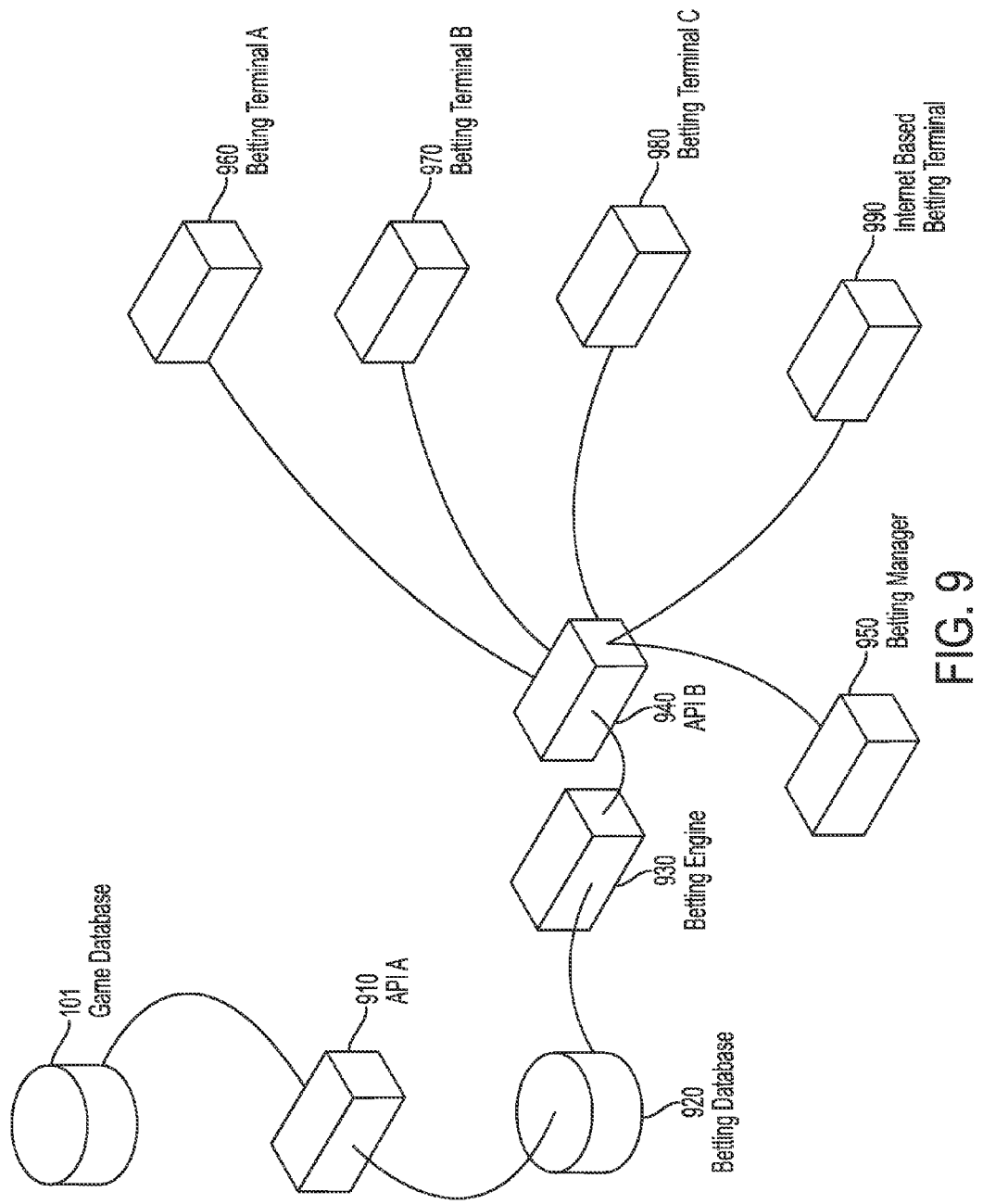
FIG. 9 show the betting system architecture

As shown in FIG. 9, the betting system described may provide data via the API B 940 to betting terminals. The betting system may include a betting database 920 which may log all wagering transactions and outcomes on events. A betting engine 930 may individually resolve wagers and calculate payments and profits. It may be capable of handling all kinds of bets from mundane one-off wagers to more exotic combination wagers on multiple events, and sweepstake wagers with large jackpots. In addition, the betting engine 930 may include a set of management tools in order to maintain individual customer accounts and generate reports. The API B 940 may deliver event information to the betting terminals, and receive bets from those terminals. The API B 940 can also be integrated with external and existing tote systems allowing bets to be placed into the virtual world from already established wagering sites. The betting terminals may be integrated with commercial off-the-shelf hardware such as barcode readers and thermal receipt printers to produce an integrated point of sale system able to take wagers on virtual events. The Internet based betting terminal 990 can be a component that users plug into an existing website or a module that user downloads to their computer in order to take bets on virtual game world events. The betting system may include a central server that pushes event data to the betting engine 930, which then distributes the event data to the connected IPOS terminals. An IPOS terminal is a point of sale terminal as one might find in a store. Event data may contain update data on horses, odds, tracks, off times, video display data, and results.

FIG. 2 show a schedule of competition events generated inside the virtual world. The program schedule module 108 develops a schedule of competition events before or after the odds for an event have been generated. The schedule of events is distributed throughout the world via the virtual world API 105 to visualization terminals and advertised as described.

As shown in FIG. 10, instead of utilizing third party tote systems; a centralized betting engine may be used for pari-mutuel pool betting. The betting system may manage and resolve betting transactions. Additionally, the betting engine 930 may be responsible for providing odds for the upcoming competitions based on the probability distribution supplied from the probability module 104 that can located anywhere in the world. The betting engine 930 can either be deployed locally, regionally, or centrally dependent upon the regulatory environment of the local market. This engine may collect pool bets in real time from all distributed localized betting engines around the world, adjust the odds according to the betting tendencies of the bettors or punters, and re-publish the updated odds. In this scenario, the house may take a percentage of the pool and the remaining amount will be paid out as winnings, which, from a marketing standpoint, can lead to big pools, large win potentials, and exciting promotional opportunities.

The invention claimed is:

1. A computer-implemented method for creating a live virtual event for the purpose of world-wide gambling via one or more of internet, television simulcast, and on monitors or kiosks in gambling establishments, comprising the steps of:
    a) using the computer to create a virtual sport event or game world for the virtual sport event or game contestants for the virtual sport event, wherein the event is at least one of a pari-mutuel exchange, and a fixed-odds event, and wherein the event performs functions of a real-world counterpart;
    b) using the computer to create real time unique and independent individual contestant behavior so that an outcome of the virtual event is emergent, the outcome is not known prior to the event finishing, further comprising the steps of:
        i) utilizing artificial intelligence optimization goal seeking decision making based upon environmental constraints,
        ii) utilizing genetic tactical tendencies of the contestant,
        iii) utilizing contestant reaction to other competitors, and
        iv) utilizing attributes of the contestant;
    c) using the computer to determine an outcome in real-time as the virtual event unfolds based upon a plurality of factors using perturbation models so that each virtual event is a unique event for which the outcome is unknown when the virtual event begins and for which the outcome of the virtual event cannot be fixed or manipulated;
    d) using the computer to provide real-time data, including, at least one of event results, outcome probabilities, contestant past performance, and contestant attributes, for being capable of supporting at least one of: fixed odds, pari-mutuel and exchange wagering;
    e) using the computer to provide real-time visual access to the virtual event on a simultaneous global basis provided over one or more of the internet, television simulcast, on monitors and kiosks in the gambling establishments;
    wherein the genetic tactical tendencies include:
    the contestant's competitive strategy, or
    the contestant's ability to compete in various conditions, or
    the contestant's ability to compete on various surfaces,
    wherein the computer comprises at least a processor and a memory.

2. The method of claim 1, further comprising the step of:
    determining outcome probabilities before the event transpires based on iterative simulation of a system by minutely varying parameters and analyzing them to calculate fixed odds for the virtual event.

3. The method of claim 1, further comprising the step of:
    utilizing horse genetics in the creation of the individual contestant behavior.

4. The method of claim 3, wherein the step of utilizing horse genetics, further comprises the steps of:

a. beginning with two different horse contestants having parameters including speed, stamina and acceleration,
b. encoding these parameters into binary form,
c. pinpointing cross over points where binary bits may be swapped at a specified probability for each parameter,
d. mutating bits at a very low probability, and
e. creating a new horse by averaging the final bit string.

5. A method according to claim 1, wherein the virtual event may be any type of sport or skill based game, including sporting events such as a horse race, an auto race, a stock car race, a Formula I race, a NASCAR race, a boxing match, a kick boxing match, an ultimate fight match, a wrestling match, a basketball game, a soccer game, a rugby game, a football game, a baseball game, a hockey game, a lacrosse match, a dog race, a greyhound race, a harness race, a steeplechase and other skill based games and wagering events.

\* \* \* \* \*